(12) United States Patent
Matsumoto

(10) Patent No.: US 7,961,335 B2
(45) Date of Patent: Jun. 14, 2011

(54) VARIABLE SPECTROSCOPY DEVICE

(75) Inventor: Shinya Matsumoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 226 days.

(21) Appl. No.: 12/446,832

(22) PCT Filed: Nov. 14, 2007

(86) PCT No.: PCT/JP2007/072120
§ 371 (c)(1),
(2), (4) Date: Apr. 23, 2009

(87) PCT Pub. No.: WO2008/059892
PCT Pub. Date: May 22, 2008

(65) Prior Publication Data
US 2010/0027010 A1 Feb. 4, 2010

(30) Foreign Application Priority Data
Nov. 17, 2006 (JP) .................. 2006-311436

(51) Int. Cl.
*G01B 9/02* (2006.01)
*G01J 3/45* (2006.01)
(52) U.S. Cl. ...................... 356/519; 356/454
(58) Field of Classification Search .................. 356/454, 356/480, 519
See application file for complete search history.

(56) References Cited

U.S. PATENT DOCUMENTS

| | | | | |
|---|---|---|---|---|
| 6,819,492 | B1 * | 11/2004 | Picard et al. .................. | 359/579 |
| 6,822,779 | B2 * | 11/2004 | Chi .............................. | 359/290 |
| 6,822,798 | B2 * | 11/2004 | Wu et al. ....................... | 359/578 |
| 6,833,957 | B2 * | 12/2004 | Sato .............................. | 359/579 |
| 6,859,321 | B2 * | 2/2005 | Kimerling et al. ............ | 359/578 |
| 6,876,482 | B2 * | 4/2005 | DeReus ....................... | 359/290 |
| 6,934,033 | B2 * | 8/2005 | McDaniel et al. ............ | 356/454 |
| 7,541,584 | B2 * | 6/2009 | Antoszewski et al. ...... | 250/338.4 |
| 7,844,145 | B1 * | 11/2010 | Waters ............................ | 385/24 |
| 2011/0019202 | A1 * | 1/2011 | Iwaki et al. .................. | 356/519 |

FOREIGN PATENT DOCUMENTS

| | | |
|---|---|---|
| JP | 01-094312 | 4/1989 |
| JP | 02-012218 | 1/1990 |
| JP | 02-257676 | 10/1990 |
| JP | 2002-277758 | 9/2002 |

* cited by examiner

*Primary Examiner* — Patrick J Connolly
(74) *Attorney, Agent, or Firm* — Scully, Scott, Murphy & Presser, P.C.

(57) ABSTRACT

Desired spectral characteristics are attained by making reflection films close enough. A variable spectroscopy device (1) has a pair of optical substrates (2, 3) opposing each other with an interval therebetween, two reflection films (5) opposing each other which are respectively disposed on opposing surfaces of the optical substrates (2, 3), two sensor electrodes (6) opposing each other which are disposed on the same surfaces as the reflection films (5) and which constitute an interval sensor for detecting an interval between the optical substrates (2, 3), and an actuator (4) which relatively moves the optical substrates (2, 3) and changes the interval between the optical substrates (2, 3). A distance between the opposing surfaces of the two sensor electrodes (6) is longer than a distance between the opposing surfaces of the two reflection films (5).

7 Claims, 5 Drawing Sheets

VARIABLE SPECTROSCOPY DEVICE

TECHNICAL FIELD

The present invention relates to a variable spectroscopy device.

BACKGROUND ART

Conventionally, a Fabry-Perot type variable spectroscopy device which varies the wavelength of transmission light by changing a surface interval between two planar optical substrates is known (e.g., refer to Patent Document 1).

The variable spectroscopy device includes a reflection film and a capacitance sensor electrode on the opposing surface of each optical substrate. The variable spectroscopy device can detect the size of the interval between the optical substrates using the capacitance value between the capacitance sensor electrodes and make fine adjustments of the surface interval by controlling the driving voltage of an actuator.

Patent Document 1: Japanese Unexamined Patent Application, Publication No. 2002-277758

DISCLOSURE OF INVENTION

As represented by Expression (1), the Fabry-Perot type variable spectroscopy device can selectively obtain a periodic peak of a transmission spectrum with a wavelength λ which resonates with the surface interval d between a pair of reflection films due to interference of the light.

$$2nd \cos \theta = m\lambda \quad (1)$$

where n: index of refraction of a medium in the surface interval d between the pair of reflection films
d: surface interval between the pair of reflection films
λ: wavelength
θ: incident angle at the reflection film
m: order (integer).

Herein, the free spectral range (FSR) is given by Expression (2).

$$FSR = \lambda^2 / 2nd \quad (2)$$

In the case of using the Fabry-Perot type variable spectroscopy device in the visible region, in order to ensure sufficient free spectral range, the interval between the reflection films may preferably be adjusted within a range less than several micrometers. However, when high parallelism of the optical substrates cannot be achieved due to the difficulty in assembling, dimensional changes during operation, and the like, it is difficult to sufficiently minimize the interval between the reflection films of the optical substrates because parts other than the reflection films on the optical substrates that are relatively tilted touch each other.

Even if high parallelism can be achieved, when dust is attached or a protrusion due to a scratch is formed on the part other than the reflection films on the optical substrates, because of these disturbances, it is still difficult to sufficiently minimize the interval between the reflection films close to the center.

The present invention has been conceived in light of the circumstances described above, and an object thereof is to provide a variable spectroscopy device which can attain desired spectral characteristics by making the reflection films close enough.

In order to realize the above-described object, the present invention provides the following solutions.

The present invention provides a variable spectroscopy device has a pair of optical substrates opposing each other with an interval therebetween, two reflection films opposing each other which are respectively disposed on opposing surfaces of the optical substrates, two sensor electrodes opposing each other which are disposed on the same surfaces as the reflection films and which constitute an interval sensor to detect an interval between the optical substrates, and an actuator which relatively moves the optical substrates and changes the interval between the optical substrates. A distance (d1) between the opposing surfaces of the two sensor electrodes is longer than a distance (d2) between the opposing surfaces of the two reflection films.

According to the present invention, the interval sensor may be a capacitance sensor which detects the interval between the optical substrates by using a capacitance formed between the two sensor electrodes.

According to the present invention, the sensor electrode may be disposed relatively outside with respect to the reflection film.

According to the present invention, the interval-side surface of the reflection film may be disposed further than the interval-side surface of the sensor electrode with respect to the surface of the optical substrate on which the reflection film and the sensor electrode are provided.

According to the present invention, the actuator may change the interval between the optical substrates within the range in that the size of the interval between the surfaces of the reflection films is less than 2 micrometers.

Particularly, when the present invention is employed as a spectroscopy apparatus for fluorescent agents used in the research field of biotechnology, pharmaceutical products, or the like, in order to ensure a free spectral range of about dozens nm in the visible region, the interval between the optical substrates may preferably be changed within a range in which the size of the interval between the surfaces of the reflection films is less than 2 micrometers.

According to the present invention, the sensor electrode may further have a protective film on the interval-side surface. The surface of the reflection film may be disposed further than the surface of the protective film with respect to the surface of the optical substrate on which the reflection film is provided.

According to the present invention, two or more of the actuators may be provided at intervals in the circumferential direction and be controlled independently.

According to the present invention, an advantage is afforded in that desired spectral characteristics can be attained by making the reflection films close enough.

EXPLANATION OF REFERENCE SIGNS

Figure 1:
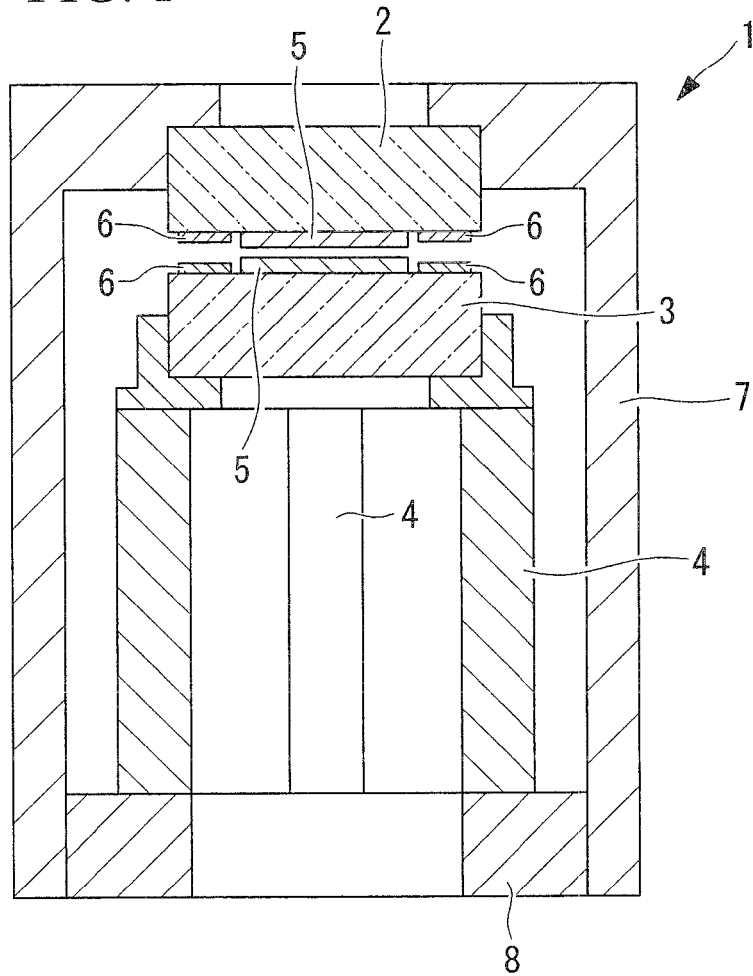
FIG. 1 is a longitudinal sectional view showing a variable spectroscopy device according to one embodiment of the present invention.

1: variable spectroscopy device
2, 3: optical substrate
4: actuator
5: reflection film
6: capacitance sensor electrode
12: protective film

BEST MODE FOR CARRYING OUT THE INVENTION

Hereinbelow, a variable spectroscopy device 1 according to one embodiment of the present invention will be described with reference to FIGS. 1 to 4B.

As shown in FIG. 1, the variable spectroscopy device 1 according to the embodiment has two optical substrates 2 and 3 disposed with an interval therebetween and an actuator 4, like a piezoelectric element, disposed between the optical substrates 2 and 3, being driven so as to adjust the size of the interval between the two optical substrates 2 and 3.

An opposing surface of each of the optical substrates 2 and 3 is a flat surface with high flatness. The opposing surface of each of the optical substrates 2 and 3 has a reflection film 5 which is made of a circular dielectric multilayer film over the region including the optical effective diameter A, which is close to the center (refer to FIG. 2). Outward in the radial direction of the reflection film on each of the optical substrates 2 and 3, two or more (e.g., four pairs) capacitance sensor electrodes 6 are provided at intervals in the circumferential direction. The capacitance sensor electrodes 6 provided on each of the optical substrates 2 and 3 are composed of metal films provided at mutually opposing positions. With this structure, the size of the interval between the optical substrates 2 and 3 can be detected by using the capacitance of a parallel plate capacitor formed between both capacitance sensor electrodes 6. In the drawings, reference numerals 7 and 8 denote supporting members that support these optical substrates 2 and 3 and the actuator.

Figure 2:
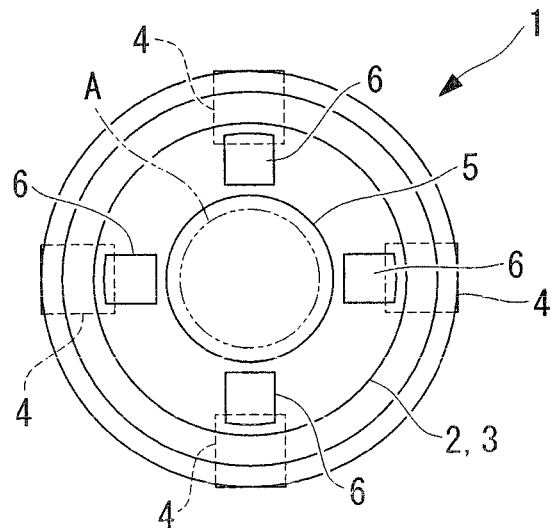
FIG. 2 is a plan view of optical substrates provided in the variable spectroscopy device shown in FIG. 1.

As shown in FIG. 2, for example, the actuator 4 is provided at four points at intervals in the circumferential direction, corresponding to the capacitance sensor electrodes 6. By changing the electric voltage applied thereto, each actuator 4 is independently expanded and contracted and thus changes the size of the interval and the tilt angles of the optical substrates 2 and 3. By performing feedback control of the electric voltage applied to the actuator 4 on the basis of the signal detected by the capacitance sensor electrodes 6, the size of the interval and the tilt angles of the optical substrates 2 and 3 can be accurately adjusted.

Figure 3:
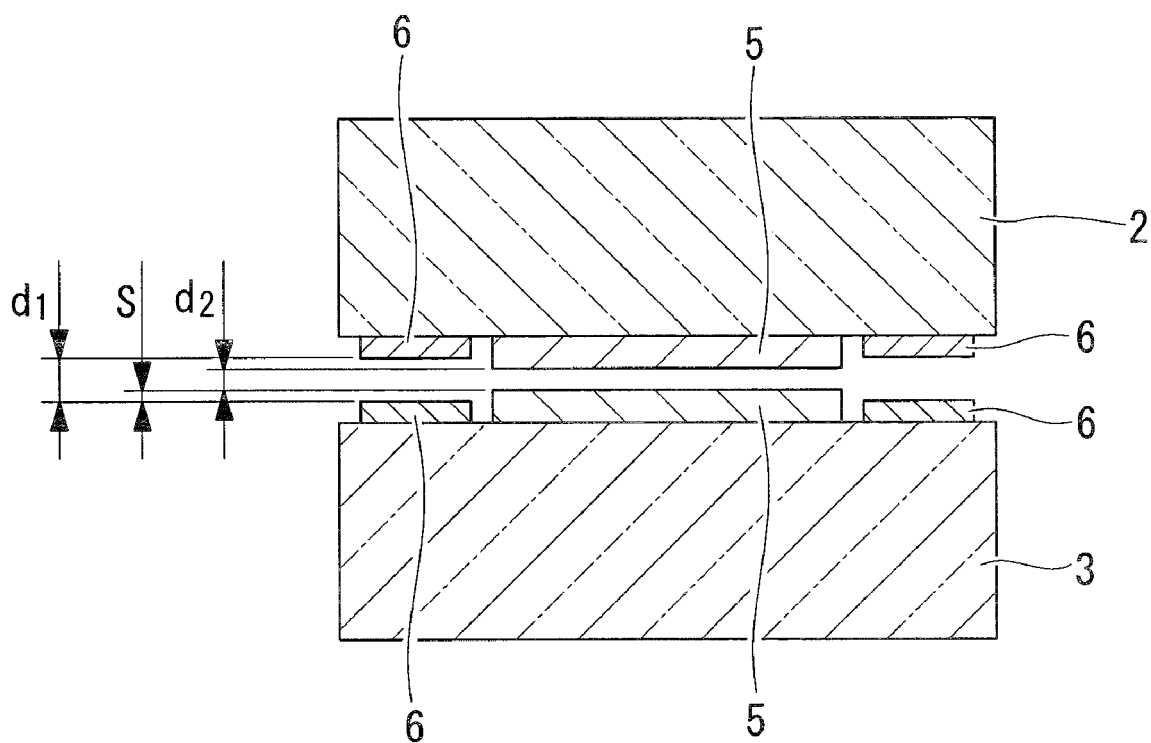
FIG. 3 is a longitudinal sectional view of the optical substrates provided in the variable spectroscopy device shown in FIG. 1.

As shown in FIG. 3, with the variable spectroscopy device 1 according to the embodiment, the thickness of the reflection film 5 on each of the optical substrates 2 and 3 is larger than the thickness of the capacitance sensor electrodes 6 outward in the radial direction. For example, the thickness of the reflection film 5 is about 1 micrometer. The thickness of the capacitance sensor electrodes 6 is about 400 nm. The surface of the reflection film 5 is disposed one step higher than the surface of the capacitance sensor electrodes 6. Accordingly, a step S is formed between the surface of the reflection film 5 and the surface of the capacitance sensor electrodes 6. In other words, the surface of the reflection film 5 is disposed further than the surface of the capacitance sensor electrodes 6 with respect to the surface of the optical substrate on which the reflection film 5 is disposed, and the distance d1 between the opposing surfaces of the capacitance sensor electrodes 6 is longer than the distance d2 between the surfaces of the reflection films 5.

The operation of the variable spectroscopy device 1 according to this embodiment, having the above-described configuration, will be described below.

The variable spectroscopy device 1 according to the embodiment is assembled so as to have the two optical substrates 2 and 3 oppose each other with an interval therebetween by having the reflection films 5 and the capacitance sensor electrodes 6 oppose each other. In this case, in order to attain a high spectral efficiency, it is necessary to dispose the reflection films 5 to have high parallelism. However, it is difficult to assemble the reflection films 5 perfectly in parallel from the beginning due to the dimensional tolerance or the like of the actuator 4 and the optical substrates 2 and 3. Therefore, the optical substrates 2 and 3 are generally assembled with a relatively slight tilt.

Figure 4A:
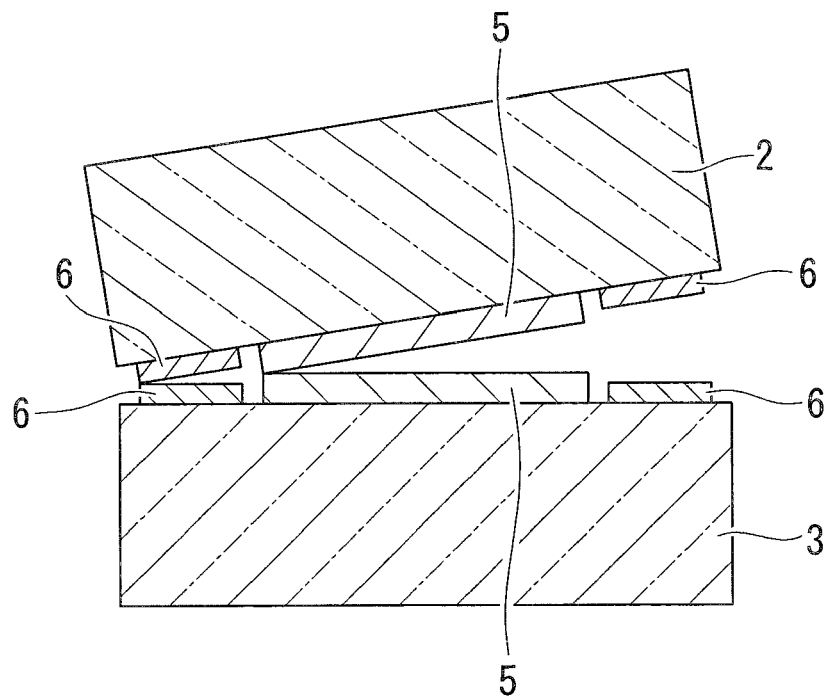
FIG. 4A is a longitudinal sectional view showing an embodiment in which the optical substrates shown in FIG. 3 are relatively tilted.

With the variable spectroscopy device 1 according to the embodiment, the surface of the reflection film 5 is disposed one step higher than the surface of the capacitance sensor electrodes 6 on each of the optical substrates 2 and 3. In this way, according to the variable spectroscopy device 1 of the embodiment, the size of the interval between the capacitance sensor electrodes 6 disposed on the outer circumferential edge or on the outer circumference side of the optical substrates 2 and 3 can be set larger than the size of the interval between the reflection films 5. As a result, as shown in FIG. 4A, with the variable spectroscopy device 1 according to the embodiment, even if the optical substrates 2 and 3 are relatively tilted, interference between the outer circumferential edges of the optical substrates 2 and 3 or the capacitance sensor electrodes 6 can be avoided. Accordingly, it is possible to prevent the occurrence of an inconvenience that the reflection films 5 cannot be brought close together because of the interference.

Figure 4B:
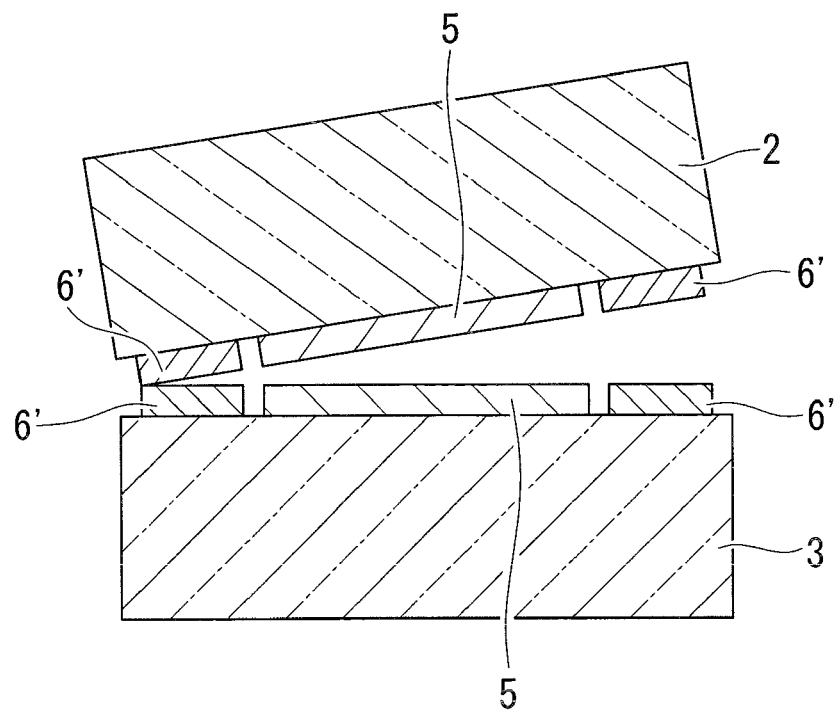
FIG. 4B is a longitudinal sectional view showing a comparative example in which the optical substrates shown in FIG. 3 are relatively tilted.

In contrast, if the thickness of the reflection film 5 and the thickness of capacitance sensor electrodes 6' are equal, as shown in the comparative example of FIG. 4B, the capacitance sensor electrodes 6' interfere with each other with a large interval between the reflection plates 5. As a result, the capacitance sensor electrodes 6' cannot be brought any closer.

According to the variable spectroscopy device 1 of the embodiment, it is possible to drive the actuator 4 to the position where the reflection films 5 are sufficiently close, even if the reflection films 5 are relatively minimally tilted (e.g., at a tilt angle of around 1 minute of arc). As a result, it is possible to make the optical substrates 2 and 3 close so that the size of the interval between the reflection films 5 is just 1 wavelength (e.g., around 1 micrometer) of light with the desired wavelength. Therefore, only the light with the desired wavelength can be selectively transmitted.

According to the variable spectroscopy device 1 of the embodiment, two or more actuators 4 disposed at intervals in the circumferential direction are independently driven. Thus, even if the optical substrates 2 and 3 are relatively minimally tilted in assembling, high parallelism can be achieved by operating the actuators 4 after assembly to correct the tilt of the optical substrates 2 and 3. In this way, with the variable spectroscopy device 1 according to the embodiment, it is possible to improve the spectral efficiency. In other words, with the variable spectroscopy device 1 according to the embodiment, since it is not necessary to configure the optical substrates 2 and 3 with high parallelism in assembling, the assembly operation can be simplified.

In this case, with the variable spectroscopy device 1 according to the embodiment, with the optical substrates 2 and 3 minimally tilted, it is possible to assemble the variable spectroscopy device 1 by making the reflection films 5 close to each other. Accordingly, with the variable spectroscopy device 1 according to the embodiment, the operation range of the actuator 4 in the operation of making the reflection films 5 parallel after assembling can be cut down. As a result, with the variable spectroscopy device 1 according to the embodiment, the variable spectroscopy device 1 can be constructed compactly.

With the variable spectroscopy device 1 according to the embodiment, when the reflection films 5 brought close together for assembling them, with the optical substrates 2 and 3 minimally tilted, interference of the capacitance sensor electrodes 6 can be avoided. In this way, with the variable spectroscopy device 1 according to the embodiment, damage of the capacitance sensor electrodes 6 can be prevented.

According to the variable spectroscopy device 1 of the embodiment, with the reflection films 5 disposed in parallel, a relatively large interval between the capacitance sensor electrodes 6 can be ensured. As a result, with the variable spectroscopy device 1 according to the embodiment, even if dust is attached or a protrusion due to a scratch is formed on the capacitance sensor electrodes 6, a hindrance to bringing the reflection films 5 closer together, because of these disturbances, can be prevented.

With the variable spectroscopy device 1 according to the embodiment, by adjusting the thickness of the dielectric multilayer film constituting the reflection film 5 and the thickness of the metal film constituting the capacitance sensor electrode 6, the surface of the reflection film 5 can be disposed at a position which is one step higher than the surface of the capacitance sensor electrode 6. However, instead of this, the present invention may employ the following method.

Figure 5:
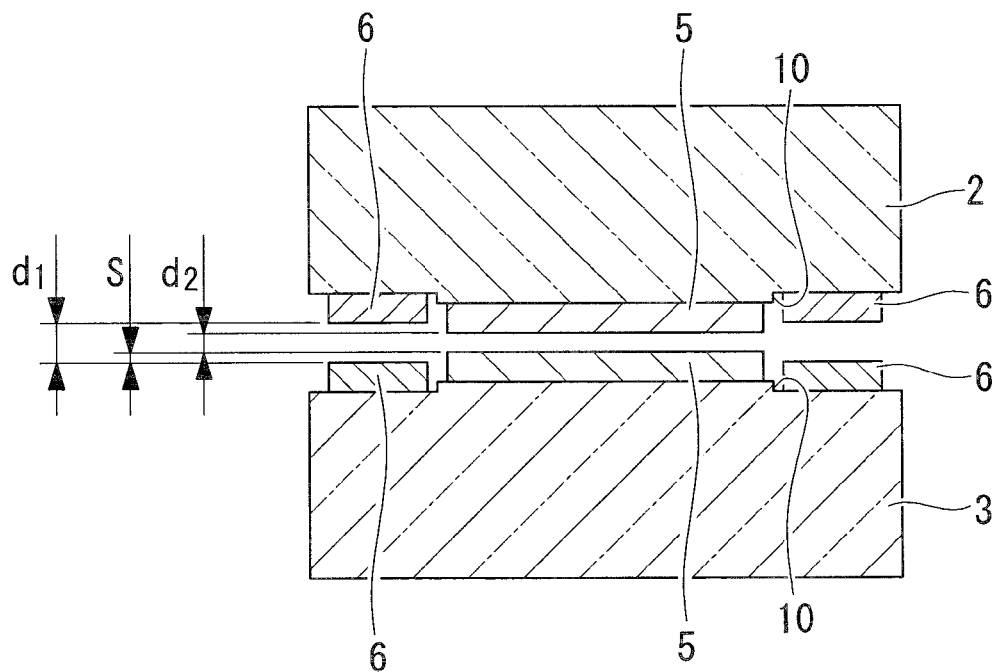
FIG. 5 is a longitudinal sectional view showing the optical substrates according to a first modification of the variable spectroscopy device shown in FIG. 1.

As shown in FIG. 5, for example, having a step 10 provided on the opposing surfaces of the optical substrates 2 and 3, the reflection film 5 and the capacitance sensor electrode 6 whose thickness are approximately equal may be formed on the surfaces of the optical substrates 2 and 3 with the different height.

Figure 6:
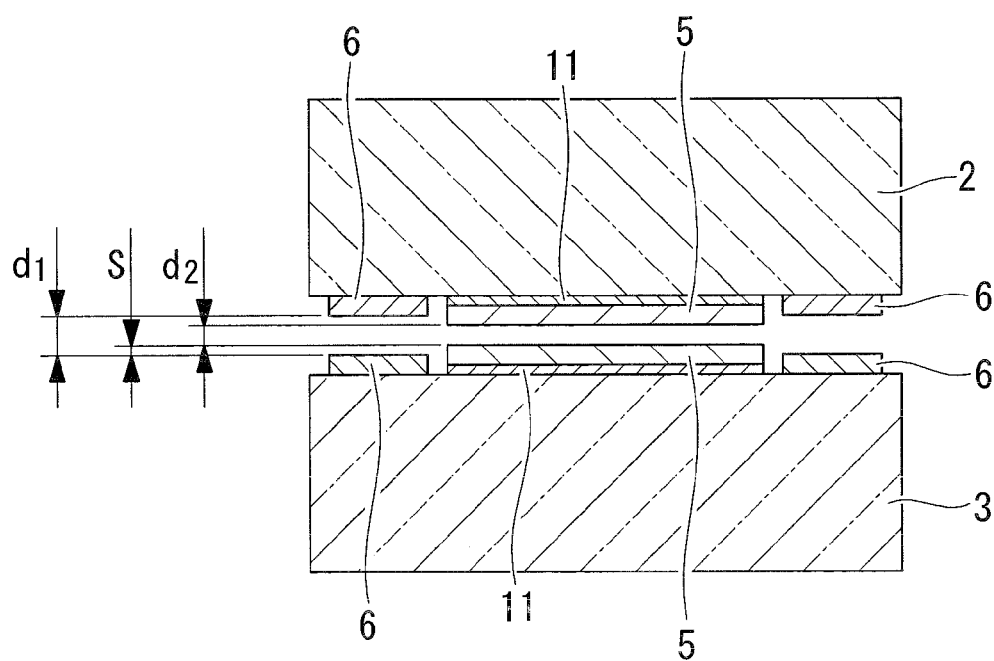
FIG. 6 is a longitudinal sectional view showing the optical substrates according to a second modification of the variable spectroscopy device shown in FIG. 1.

As shown in FIG. 6, at the center part of the opposing surfaces of the optical substrates 2 and 3, a coating 11 made of $SiO_2$ or the like for raising the reflection film 5 may be formed.

Figure 7:
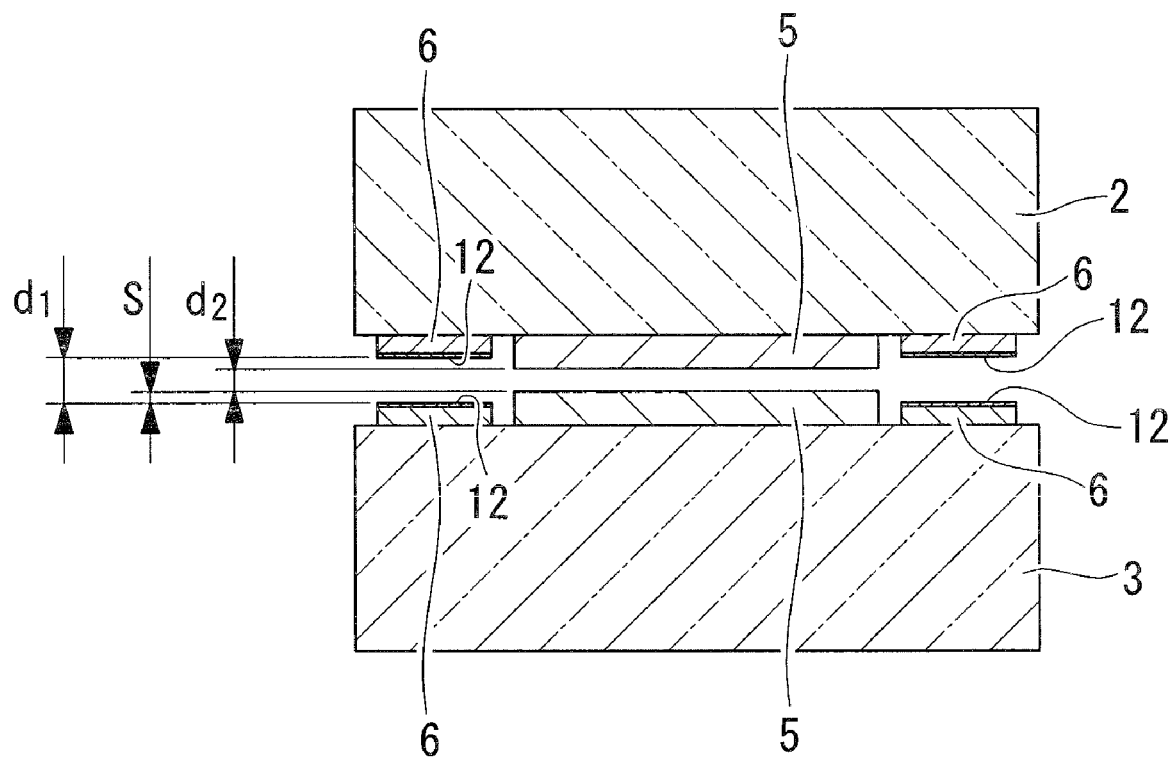
FIG. 7 is a longitudinal sectional view showing the optical substrates according to a third modification of the variable spectroscopy device shown in FIG. 1.

Furthermore, as shown in FIG. 7, for example, on the surface of the capacitance sensor electrode 6, a protective film 12 made of $SiO_2$ or the like may be provided, in order to ensure the prevention of damage by the interference of the capacitance sensor electrodes 6. In this case, a similar advantage to that described above can be afforded by constituting the device so as to dispose the surface of the protective film 12 lower than the surface of the reflection film 5.

In the above described embodiment, the capacitance between the capacitance sensor electrodes formed on both of the optical substrates 2 and 3 is used as a sensor to detect the interval between the optical substrates 2 and 3. However, a sensor used in the spectroscopy device according to the present invention is not limited to the sensor described in the above embodiment. For example, an eddy-current type sensor may be employed which uses magnetic mutual-induction between the electrodes formed on the surfaces of the optical substrates 2 and 3.

The invention claimed is:

1. A variable spectroscopy device comprising:
   a pair of optical substrates opposing each other with an interval therebetween;
   two reflection films opposing each other which are respectively disposed on opposing surfaces of the optical substrates;
   two sensor electrodes opposing each other which are disposed on the same surfaces as the reflection films and which constitute an interval sensor for detecting an interval between the optical substrates; and
   an actuator which relatively moves the optical substrates and changes the interval between the optical substrates,
   wherein a distance (d1) between the opposing surfaces of the two sensor electrodes is longer than a distance (d2) between the opposing surfaces of the two reflection films.

2. A variable spectroscopy device according to claim 1, wherein the interval sensor is a capacitance sensor which detects the interval between the optical substrates by using a capacitance formed between the two sensor electrodes.

3. A variable spectroscopy device according to claim 1, wherein the sensor electrode is disposed relatively outside with respect to the reflection film.

4. A variable spectroscopy device according to claim 1, wherein an interval-side surface of the reflection film is disposed further than an interval-side surface of the sensor electrode with respect to the surface of the optical substrate on which the reflection film and the sensor electrode are provided.

5. A variable spectroscopy device according to claim 1, wherein the actuator changes the interval between the optical substrates within a range in which the size of the interval between the surfaces of the reflection films is less than 2 micrometers.

6. A variable spectroscopy device according to claim 1,
   wherein the sensor electrode further comprises a protective film on the interval-side surface, and
   wherein the surface of the reflection film is disposed further than the surface of the protective film with respect to the surface of the optical substrate on which the reflection film is provided.

7. A variable spectroscopy device according to claim 1, wherein two or more of the actuators are provided at intervals in a circumferential direction and are controlled independently.

* * * * *